INVENTOR.
ROSCOE DAVIS

United States Patent Office 2,949,104
Patented Aug. 16, 1960

2,949,104

AUTOMATIC STARTING MECHANISM FOR ENGINES

Roscoe Davis, Base Line, Mich., assignor, by direct and mesne assignments, to Thermo Auto-Matic Starter, Incorporated, East Detroit, Mich., a corporation of Michigan Filed Feb. 4, 1957, Ser. No. 637,903

6 Claims. (Cl. 123—179)

This invention relates to a mechanism for automatically starting the engine of a vehicle.

The arrangement is designed to start the engine at a predetermined time and to automatically restart the engine if it should stall.

It is an object of the present invention to provide a mechanism of the type described which is of fool-proof design, which is of economical construction and which can be applied to a motor vehicle readily.

Figure 2:
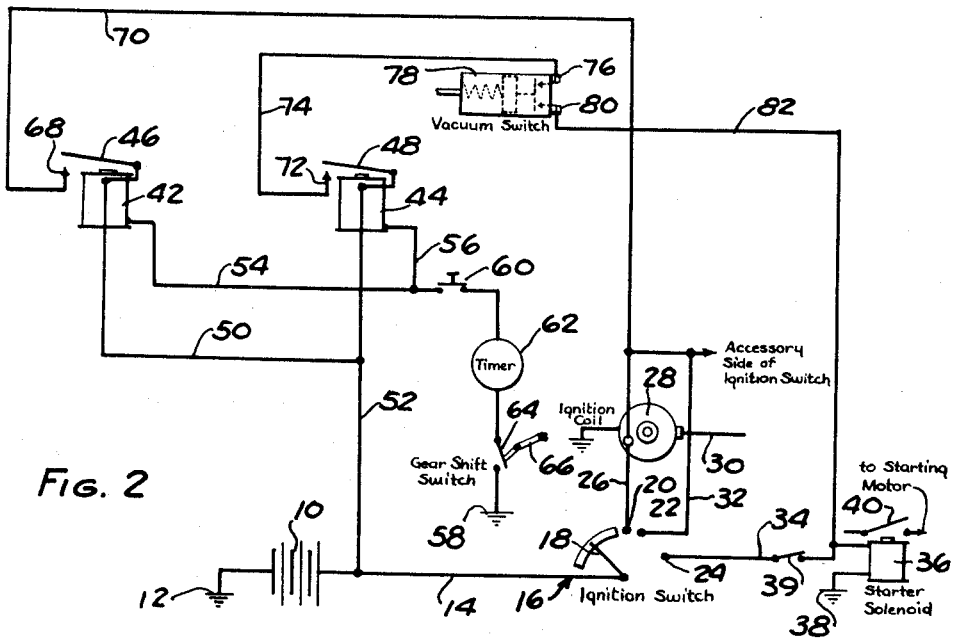
Fig. 2 is a wiring diagram illustrating the manner in which the present invention is incorporated in the electrical circuit of a motor vehicle.

In the wiring diagram illustrated in Fig. 2, a portion of the electrical circuit of an automotive vehicle is illustrated. The vehicle battery is illustrated at 10. One side of the battery is grounded as at 12 and the other side of the battery is connected by a conductor 14 with the ignition switch 16. Ignition switch 16 is of the conventional key-operated type and includes a switch arm 18 which is arranged to close with an ignition contact 20, an accessory contact 22 and a starter contact 24. Contact 20 is connected by a conductor 26 with the ignition coil 28. The secondary of coil 28 is connected by a conductor 30 with the sparking circuit, not illustrated. Contact 22 is connected by a conductor 32 with the circuit of the accessories on the automobile. Contact 24 is connected by a conductor 34 with a starter solenoid 36 that is grounded as at 38. In automobiles having an automatic transmission, the conventional gear shift neutral switch 39 is arranged between the ignition switch and the starter solenoid as shown. When solenoid 36 is energized, it is arranged to close a switch 40 in circuit with the starting motor of the vehicle, not illustrated. The arrangement thus far described is conventional and is illustrated merely to indicate the manner in which the apparatus of the present invention is arranged on a conventional automotive vehicle.

The present invention comprises an arrangement for automatically starting an automotive vehicle of this type. This arrangement includes a pair of relays 42 and 44 provided with switch arms 46 and 48, respectively. Battery conductors 50 and 52 connect with switch arms 46 and 48, respectively, and with one end of the coils of relays 42 and 44. The other ends of the coils of relays 42 and 44 are connected by conductors 54 and 56, respectively, to ground at 58 through an on-off switch 60, a timer switch 62 and a safety switch 64. Timer switch 62 is of the conventional manually operable type. It may be set to close the circuit through the coils of relays 42 and 44 at a predetermined time. Safety switch 64 is arranged to be operated by the gear shift lever or other manually actuated transmission control member 66 of the vehicle. Switch 64 is designed to be closed when the transmission control 66 is set at the "neutral" or "park" position and is arranged to be opened whenever the transmission control 66 is set at any of its drive positions. Thus, at all events, the circuit through the coils of relays 42 and 44 is closed only when the vehicle transmission is in the "neutral" or "park" position.

Relay 42 has a fixed contact 68 with which switch arm 46 is adapted to close. Contact 68 is connected by a conductor 70 with the ignition coil 28. Thus, when relay 42 closes, the circuit to the ignition coil 28 is closed from battery 10 through conductors 52, 50, switch arm 46, contact 48 and conductor 70.

Relay 44 has a fixed contact arranged to be contacted by switch arm 48. Contact 72 is connected by a conductor 74 with a terminal 76 of a vacuum operated switch 78. Another terminal 80 on switch 78 is connected by a conductor 82 with conductor 34 to the starter solenoid 36.

Figure 3:
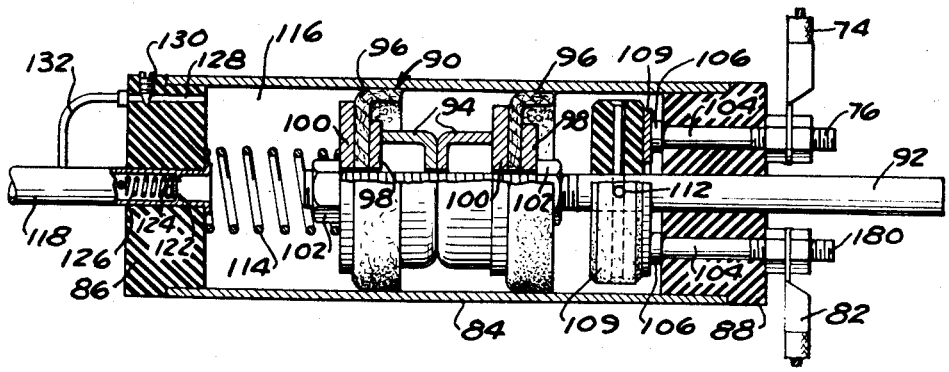
Fig. 3 is a sectional view of one of the components of the present invention.

Referring now to Fig. 3, the construction of switch 78 is there illustrated. The switch is in the form of an outer casing 84 comprising a cylinder closed at its opposite ends by walls 86 and 88. Within cylinder 84, there is arranged a piston assembly 90 which is mounted on and guided by a rod 92. Piston assembly 90 includes a pair of adjacently positioned spacers 94 against which are arranged leather cups 96 which are supported on opposite sides thereof by discs 98 and 100. The piston assembly is held together and mounted on a threaded portion of rod 92 by nuts 102. In wall 88, there is arranged a pair of studs 104 which are provided with contacts 106 at their inner ends and fashioned with the terminals 76 and 80 at their outer ends to which the conductors 74 and 82 are connected. A bridge in the form of an insulator 109 carrying a contact disc 110 is pivotally supported on rod 92 as by a pin 112 and is arranged to close with contacts 106 when the piston assembly 90 is moved to the right in cylinder 84 as viewed in Fig. 3 under the influence of a compression spring 114. Spring 114 is arranged in the chamber 116 defined by the space between the end wall 86 of cylinder 84 and the adjacent leather cup 96. Conduit 118 extends through end wall 86 and communicates at one end with chamber 116. At its other end conduit 118 connects with the intake manifold 120 (Fig. 1) of the engine. Within conduit 118, there is arranged a check valve comprising an apertured plate 122, a disc 124 and a spring 126 biasing disc 124 to a position closing the aperture in plate 122. With this arrangement, when the engine is operating, the vacuum obtaining in the manifold 120 causes the check 124 to open, thus evacuating or lowering the pressure in chamber 116 and causing piston assembly 90 to move to the left against the tension of spring 114, thereby breaking contact between bridge contact disc 110 and contacts 106.

For relieving the vacuum in chamber 116, there is provided a bleed orifice 128 which is controlled in size by a needle valve 130 and connected with conduit 118 ahead of check 124 by a conduit 132. When the engine is stopped, the pressure in intake manifold 120 rises and check 124 closes under the bias of spring 126. Thus, the vacuum obtaining in chamber 116 holds piston assembly 90 in a position shifted to the left as viewed in Fig. 3 and the circuit is broken across contacts 106. Needle valve 130 is adjusted so that air is bled into chamber 116 through bleed orifice 128 at a rate such that after a predetermined time interval, three seconds, for example, piston assembly 90 moves to the right under the influence of spring 114 and bridge contact disc 110 closes with contacts 106 and reestablishes the circuit.

Figure 1:
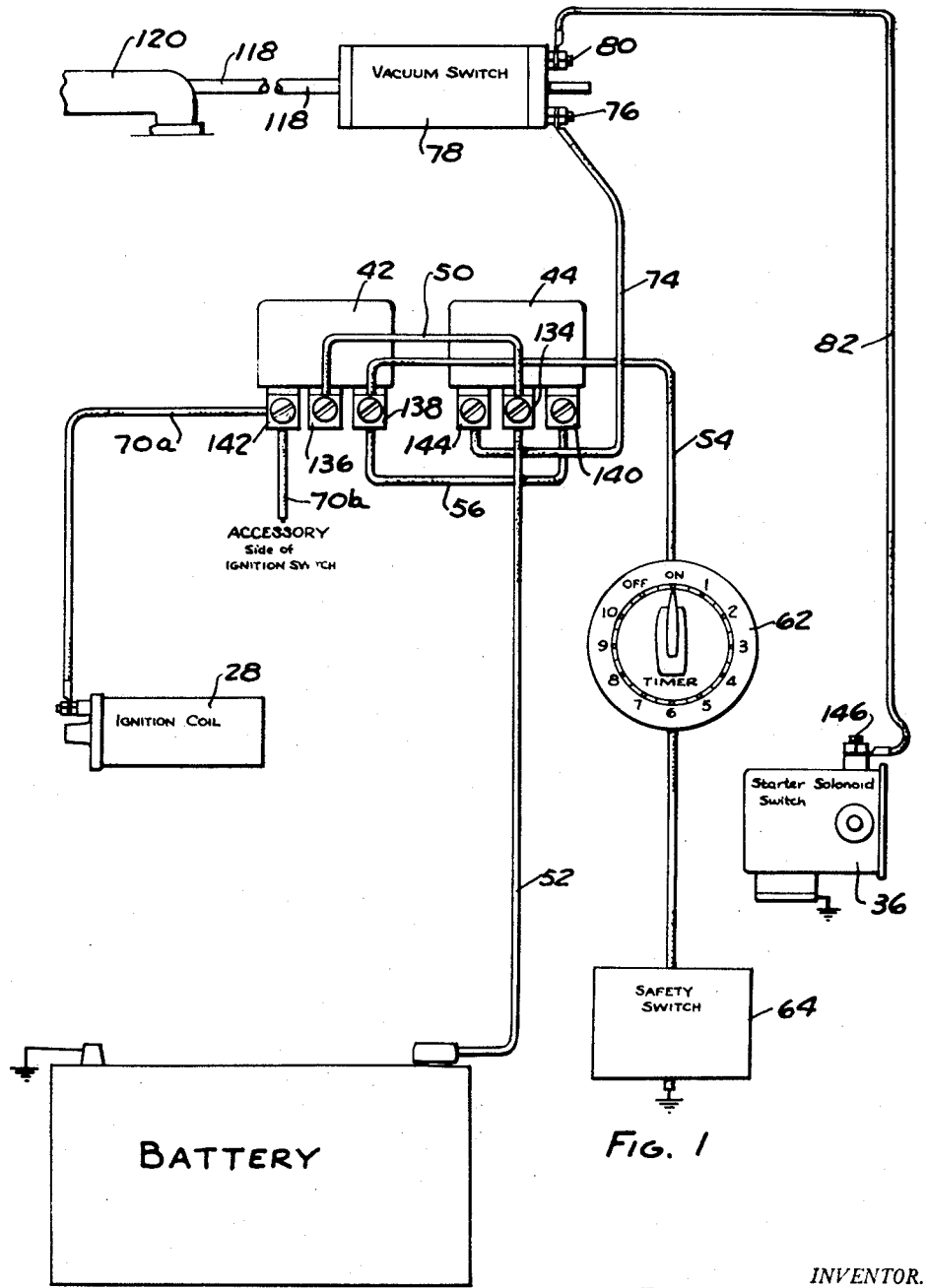
Fig. 1 is a diagrammatic view showing the arrangement of the present invention.

In Fig. 1, the arrangement illustrated in Fig. 2 is shown in a diagrammatic way and in a way which is better indicative of the manner in which the arrangement of this invention can be incorporated on a motor vehicle. Thus, the battery conductor 52 is shown connected directly to the center terminal 134 of relay 44 and the other battery conductor 50 is shown extending between the terminal 134 of relay 44 and the center terminal 136 of relay 42. Likewise, the conductor 54 from timer switch 62 is shown connected with the end terminal 138 of relay 42 and the branch conductor 56 is shown extending between the terminal 138 of relay 42 and the corresponding end terminal 140 of relay 44. In addition, the conductor designated 70 in Fig. 2 is shown as two conductors designated 70a and 70b, the conductor 70a leading directly from the other end terminal 142 of relay 42 to the ignition coil 28 and the conductor 70b extending from the end terminal 142 of relay 42 to the accessory side of the ignition switch. Conductor 74 is shown extending from the other end terminal 144 of relay 44 to the terminal 76 of vacuum switch 78 and the conductor 82 is shown extending from the other terminal 80 of vacuum switch 78 directly to the terminal 146 of the starter solenoid 36.

It will be observed that the timer switch 62 illustrated in Fig. 1 includes an "off" position and an "on" position. Thus, the switch shown at 60 in Fig. 2 is incorporated directly in the timer illustrated in Fig. 1.

In operation, let us assume that upon parking the automobile in the evening, the operator wishes to warm it up the following morning prior to getting into the car. The timer switch 62 is set at the proper hour so that the car will start at the designated time. Thus, if it is desired to start the car ten hours later, the indicator knob on the timer would be set at numeral 10 and ten hours later, the timer switch 62 will condition the circuits to the relays to close. The ignition switch 116 will be turned to the "off" position by the operator and the gear shift or the transmission control member 66 will be set in "neutral" or "park" position so that switch 64 will be closed. Thus, at the designated time, timer switch 62 will close the circuits through relays 42 and 44 as above described and switch arms 46 and 48 will be actuated to close with their respective contacts. Closing of switch arm 46 with contact 68 establishes a circuit to the ignition coil 28 and to the accessories. Thus, when setting the device, if the car heater switch is turned on, it will be started upon the closing of switch arm 46. Closing of switch arm 48 with contact 72 closes a circuit through vacuum switch 78 to the starter solenoid 36. Thus, the starter will turn over the engine and as soon as the engine starts, the pressure in the intake manifold will drop, thus reducing the pressure in chamber 116 of switch 78 and breaking the circuit to the starter solenoid at contacts 106.

When the operator gets in the car the following morning, he will insert his key in the ignition switch and turn the ignition switch to the ignition positon. Thereafter, when the gear shift lever or the transmisison control lever is shifted to one of the drive positions, the circuit to the ignition coil will remain closed through the ignition contact 20 on the ignition switch and the car will continue to operate. If, while the transmission control member 66 is in the "park" or "neutral" position and before the ignition switch is turned on, the pressure in the intake manifold should suddenly rise, for example, when the throttle is momentarily opened wide from the idle position, switch 78 will not close the circuit to the starter solenoid 36 because the release of the vacuum in chamber 116 will be delayed for a few seconds by reason of the restricted orifice 128.

While the vehicle is parked and the engine is running under the control of timer 62, unauthorized operation of the vehicle is prevented by the safety switch 64. If it is attempted to set the car in motion by actuating the gear shift or transmission control lever 66 without inserting a key in the ignition switch and turning the ignition switch to the "on" position, the circuit through the ignition coil will be opened at switch 64. Likewise, if the operator is driving along with the timer switch 62 set at the "on" position and the car should stall, it is not necessary for the operator to turn the ignition switch to start the position. The vacuum in chamber 116 will be maintained for a few seconds. Thus, bridge contact disc 110 of switch 78 will be maintained in the open position with respect to contacts 106. The operator then returns the gear shift lever or the transmission control member 66 to the "park" or "neutral" position as the case may be, and the circuit to the starter solenoid will be closed within a second or two so that the engine will be automatically restarted.

Thus, it will be seen that I have provided an arrangement for automatically starting an internal combustion engine which is of relatively simple design and can be installed on an automobile vehicle economically and in a relatively simple manner. The arrangement of this invention is adapted to start a vehicle at a predetermined time and to automatically restart the vehicle should the engine stall. Furthermore, the invention provides an arrangement which, although it starts the engine automatically, prevents unauthorized operation of the vehicle by the inclusion of the safety switch 64. Likewise, even though the absence of vacuum in the intake manifold is utilized for closing the circuit to the starter solenoid, it will be observed that a momentary rise in pressure in the intake manifold will not be effective to actuate the starter.

I claim:

1. In an electrical control system for an internal combustion engine having an ignition switch connected with the battery and having contacts thereon for closing circuits to an ignition coil and to an engine starting device when the ignition switch is actuated, means for automatically starting the engine without actuating said ignition switch comprising two pair of normally opened contacts in parallel circuit, one pair of said contacts being arranged to close a second circuit between the battery and the ignition coil and the other pair of contacts being arranged to close a second circuit between the battery and the starting device, said second circuit between the battery and starting device including a second pair of contacts therein which are opened in response to operation of the engine and are biased to close and remain in closed position when the engine is stopped and means for simultaneously closing said first two pair of contacts comprising means forming an additional circuit which includes said battery and electrically operated means which, when energized, close said first two pair of contacts, said additional circuit also including a pair of contacts which when closed energize said electrically operated means and a time clock mechanism for closing said last mentioned pair of contacts, said time clock mechanism being manually settable and arranged to close said last mentioned contacts and keep them closed upon the elapse of a predetermined time interval controlled by the setting of the time clock mechanism.

2. The combination called for in claim 1 wherein said electrically operated means comprise relays.

3. The combination called for in claim 1 wherein the engine includes a manually operated transmission control member having a "neutral" or "park" position and said additional circuit includes a second pair of contacts which are opened when said transmission control member is set at a position other than said "neutral" or "park" position.

4. The combination called for in claim 3 wherein the engine includes an intake manifold and a vacuum operated switch connected with said intake manifold and arranged to open said second pair of contacts in the second circuit between the battery and the starting device when the engine is started and to close and retain closed said last mentioned contacts when the engine stops and means on said vacuum operated switch for delaying closing of said last mentioned contacts for a predetermined time interval subsequent to stopping of the engine.

5. In an electrical control system for an internal combustion engine having a battery, an ignition circuit connected with the battery and including an ignition switch and an ignition coil, a motor starter circuit connected with the battery and including a starter switch and an intake manifold, means for automatically starting the engine comprising a vacuum-operated switch connected to said motor starter circuit in shunt relation to said starter switch and adapted, when closed, to close said starter circuit independently of said starter switch, said vacuum switch being connected with the intake manifold and being normally closed and remaining closed in response to the low vacuum in the intake manifold when the engine is not operating and being responsive to the high vacuum in the intake manifold when the engine is operating to open the motor starter circuit, means forming a second circuit between the ignition circuit and the battery, said second circuit being in shunt relation with said ignition switch, a manually settable time clock, a switch operated by said time clock, said time clock switch being arranged to open and close said second ignition circuit and the circuit of said vacuum switch, said time clock switch being closed and remaining closed in response to a predetermined time indication on the time clock, a safety switch in series circuit with the time clock switch, said safety switch being closed only when the engine transmission is in neutral condition and a manually operable switch in series circuit with said time clock switch whereby when said manually operable switch is in closed position and said time clock switch is in closed position, a circuit is closed from the battery to the ignition coil and to the motor starter independently of said ignition switch and said starter switch whenever said safety switch is actuated to the closed position.

6. The combination called for in claim 5 including means for momentarily delaying the actuation of said vacuum switch to said closed position in response to stopping of the engine whereby the circuit to the motor starter is closed after a short time delay following stopping of the engine.

References Cited in the file of this patent

UNITED STATES PATENTS

| | | |
|---|---|---|
| 2,579,958 | Perhats | Dec. 25, 1951 |
| 2,685,650 | Collins et al. | Aug. 3, 1954 |
| 2,817,022 | Comer et al. | Dec. 17, 1957 |